Figure 2:
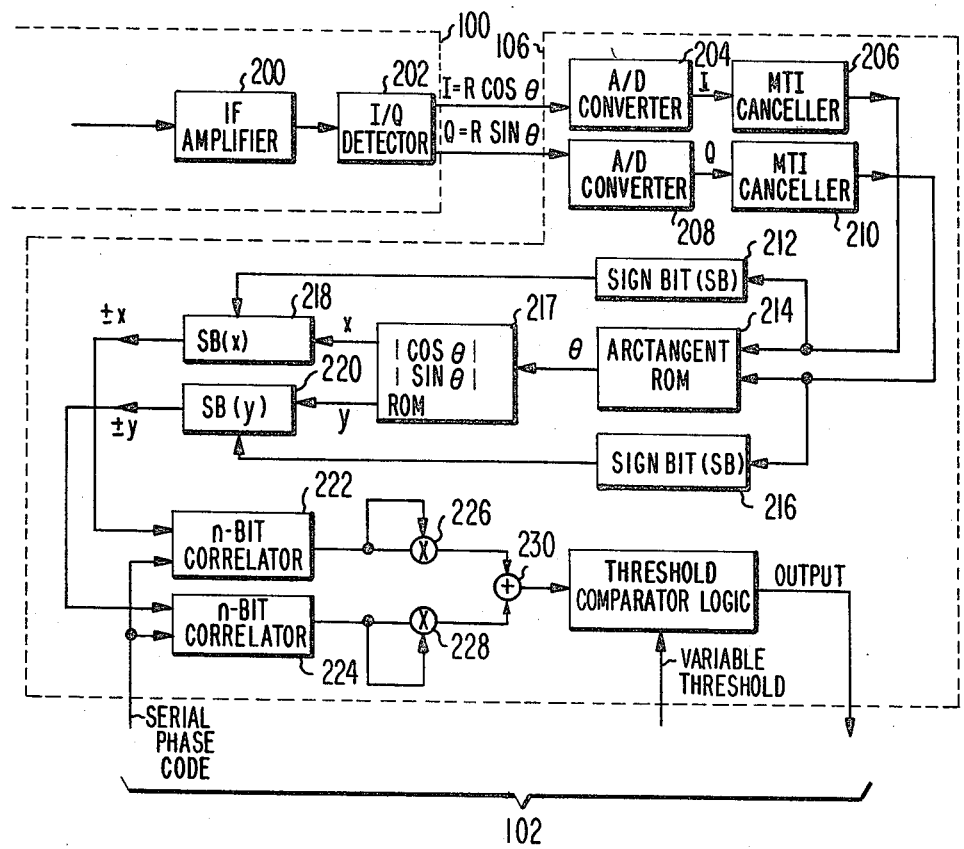

United States Patent [19]

Chressanthis et al.

[11] 4,293,856

[45] Oct. 6, 1981

[54] DIGITAL CFAR SIGNAL PROCESSOR FOR PHASE CODED RADARS

[75] Inventors: Andrew G. Chressanthis, Philadelphia, Pa.; Henry M. Halpern, Cherry Hill; Brian P. Gaffney, Medford Lakes, both of N.J.

[73] Assignee: RCA Corporation, New York, N.Y.

[21] Appl. No.: 88,565

[22] Filed: Oct. 26, 1979

[51] Int. Cl.³ .................. G01S 13/00; G01S 13/52
[52] U.S. Cl. .................. 343/5 CF; 343/5 NQ; 343/5 DP; 343/7.7
[58] Field of Search ............. 343/7.7, 5 CF, 5 NQ, 343/5 DP

[56] References Cited

U.S. PATENT DOCUMENTS 4,137,533  1/1979  Briechle et al. ............... 343/7.7

OTHER PUBLICATIONS

R. M. O'Donnell, Lincoln Laboratory Technical Note 1975-62, 21 Nov. 1975.
J. W. Taylor, Jr. et al., 1975 IEEE International Radar Conference, pp. 312-317.

*Primary Examiner*—S. C. Buczinski
*Attorney, Agent, or Firm*—Samuel Cohen; George J. Seligsohn

[57] ABSTRACT

Use of multi-bit digital arctangent function-generator to remove noise-clutter amplitude-modulation from in-phase and quadrature phase multi-bit successive samples of MTI canceller outputs and n-bit running correlation of digitized samples with serial phase code, result in increasing effective CFAR sensitivity of radar receiver.

6 Claims, 2 Drawing Figures

DIGITAL CFAR SIGNAL PROCESSOR FOR PHASE CODED RADARS

This invention relates to a phase-coded pulse compression radar which is desired to operate with a contant false alarm rate (CFAR). More particularly, the invention relates to an improved digital CFAR signal processor of the radar.

As is known in the art, an automatic control system employing a radar is useful for such purposes as defense and air traffic control. It is normally required that such an automatic control system maintain a constant false alarm rate (CFAR) in variable environments.

In recent years, various types of digital CFAR signal processors have been developed for use with phase coded waveforms of sufficient time bandwidth product such that adequate output dynamic range is achievable by pulse compression after hard limiting. The conventional digital implementation of this approach consists of inphase (I) and Quadrature (Q) detection of the received signal followed by sampling and sign only encoding. The resulting single bit I and Q data streams are then pulse compressed in single-bit digital pulse compressors and the compressed outputs are combined as $I \cdot I + Q \cdot Q$ and are applied to a fixed threshold set for any desired probability of false alarm. In heavy clutter environments, linear MTI cancellation is performed before sign only encoding and pulse compression. A property of a sign only or "hard clipped" compressor is that the output for a random input is independent of the amplitude statistics of the input and depends only on the phase sequence which is random for virtually all types of noise or distributed clutter interference. The compressor will provide greater outputs permitting detection of target returns whose phase sequence will match that of the compressor. Examples of digital CFAR signal processors are disclosed in Lincoln Laboratory technical note 1975-62, published Nov. 21, 1975 by R. M. O'Donnell and entitled "Detection and False Alarm Performance of a Phase Coded Radar With Post-MTI Limiting", and in a paper entitled "Long-Range Surveillance Radars for Automatic Control Systems" by J. W. Taylor, Jr. et al. appearing on pages 312–317 of the conference record of the 1975 IEEE International Radar Conference.

Despite the desirable CFAR properties of the sign only or "hard-clipped" pulse compressor, there is a detection loss of about 3 dB with respect to an optimum matched filter receiver. The improved digital CFAR signal processor of the present invention, which does not employ sign only encoding or hard clipping, achieves equivalent CFAR performance with less (i.e., a total of only 1–2 dB) detection loss.

Figure 1:
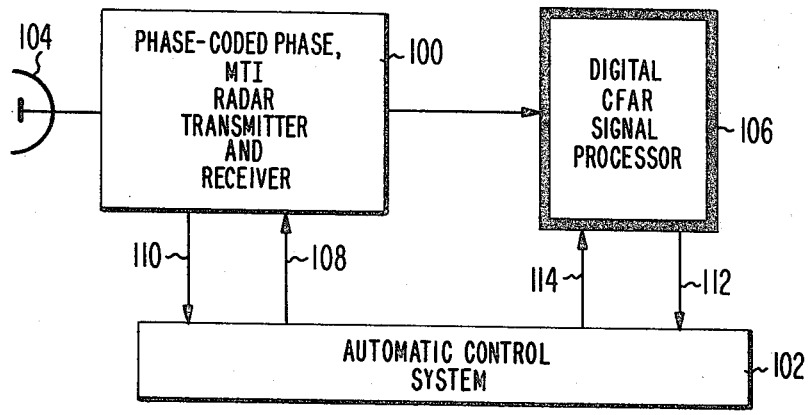

In the drawings:

FIG. 1 is a block diagram of the type system in which the improved digital CFAR signal processor of the present invention may be deployed; and FIG. 2 is an illustrative block diagram of the digital CFAR signal processor of the present invention, together with the IF amplifier and baseband detector portions of the MTI radar receiver of FIG. 1 which derives the input signals to the digital CFAR signal processor of FIG. 1.

Referring to FIG. 1, there is shown phase-coded pulse, MTI radar transmitter and receiver 100, automatic control system 102, scanning antenna 104 and digital CFAR signal processor 106. Automatic control system 102 applies required control signals to radar 100 over interconnection 108, while radar 100 feeds back data signals to automatic control system 102 over interconnection 110. Similarly, automatic control system 102 applies control signals to processor 106 over interconnection 112 and processor 106 feeds back data signals to automatic control system 102 over interconnection 114.

Among the control signals applied to radar 100 from automatic control system 102 over interconnection 108 is a selected serial phase code composed of a predetermined plural number of bits. This predetermined number is equal to or less than a given number n. By way of example, n may have the value 128 and automatic control system 102 may select any one of three different serial phase codes, a first of which is 32 bits in length, a second of which is 64 bits in length and a third of which is 128 bits in length. The serial-code bits occur at a given frequency, such as 10 MHz. As is standard, the transmitter of radar 100 forwards successive exploratory pulses of microwave energy to antenna 104 at a certain pulse repetition rate. However, the microwave energy of each exploratory pulse is phase-modulated by each of the bits of the selected serial code (i.e., the relative phase of the microwave energy phase-modulated by a bit having one binary value is zero and the relative phase of the microwave energy phase-modulated by bit having a complementary binary value is $\pi$ in the case of a binary phase coded waveform). Thus, each exploratory pulse may be considered to be composed of a plurality of juxtaposed phase-modulated subpulses equal to the predetermined number of bits in the serial phase code. Thus assuming, for example, the predetermined number of bits in the serial code is 128 and the bit-rate frequency is 10 MHz, each sub-phase has a duration of 0.1 $\mu$s and the total pulse width of the exploratory pulse is 12.8 $\mu$s.

As is known in the radar art, scanning antenna 104 receives echoes of each successive exploratory pulse reflected from targets and also receives some quantity of noise and possibly clutter. As is conventional, the radar receiver includes a front-end, an IF amplifier and a baseband detector. Further, the radar receiver normally is gated by a range gate which is open during a given range interval (selected by control signals from automatic control system 102), for forwarding to the baseband detector only those target echoes which occur during the given range interval. The size of the given range interval (determined by the width of the range gate) is normally dependent upon the maximum range of detection for a given dwell.

The output of the baseband detector of the receiver of radar 100 is applied as an input to digital CFAR signal processor 106. In general, processor 106 includes an MTI canceller, which operates as a bandpass doppler-frequency filter that removes substantially all stationary and slow-moving target signals and also removes substantially all low-frequency noise and clutter present in the output of the baseband detector. The output of the MTI canceller, beside including moving target signals of interest, also includes that portion of the noise and clutter which is within the effective passband of the MTI canceller. The MTI canceller is mode dependent.

Included in the control signals applied to processor 106 from automatic control system 102 over interconnection 114 is the same selected serial phase code that is then being used to phase-modulate the transmitted exploratory pulses. Processor 106 also includes a threshold comparator for comparing the output level from the discrimination means to a variable threshold level applied to a processor 106 from automatic control system 102 over interconnection 114. The threshold level is varied in such a manner that an output from the threshold comparator (which applies a data signal to automatic control system 102 over interconnection 112) corresponds to a preselected constant false alarm rate (CFAR). The higher the degree of discrimination of the discrimination means of processor 106, the lower is the absolute level of the threshold required to provide a certain CFAR. Further, the lower the absolute level of the threshold, the less is the effective reduction in sensitivity of the radar receiver, compared to that of an optimum-matched receiver. The improved digital CFAR signal processor 106, shown in FIG. 2, is capable of providing a substantially higher degree of discrimination between targets and noise than the various types of digital CFAR signal processors employed by the proir art.

Referring to FIG. 2, the receiver of radar 100 applies received signals, which have been down-converted to an intermediate frequency (such as about 500 MHz), through IF amplifier 200 to the input of in-phase and quadrature-phase (I/Q) baseband detector 202. I/Q detector 202 produces separate in-phase (I) and quadrature-phase (Q) outputs therefrom, both of which derive signals at the given bit-frequency or at some higher rate of the serial phase code (i.e., 10 MHz in the assumed case). However, the Q output signal is one-quarter wavelength out of phase with the I output signal from detector 202. As is known, the detection of both the I and Q components increases the effective sensitivity of the radar receiver compared to detecting only a single component.

If no noise were present, the peak amplitude R of both the I and Q output signals from detector 202 would remain constant and the phase angle $\theta$ would be phase-modulated only in increments of $\pi$ radians, in accordance with the binary value of each bit of the serial phase code. However, because noise and clutter are actually present, the I and Q output signals of detector 202 are additionally modulated, both in amplitude and in phase, in accordance with noise clutter.

Processor 106 comprises first means including analog-to-digital (A/D) converter 204 and an MTI canceller 206 for processing the I output signal from detector 202. Similarly, processor 106 comprises second means including A/D converter 208 and MTI canceller 210 for processing the Q output signal from detector 202. More specifically, each of converters 204 and 208 samples the instantaneous amplitude of its analog input signal from detector 202 at a sampling rate which is at least twice the given bit frequency of the serial phase code (in order to comply with the Nyquist criterion) and converts the value of each instantaneous amplitude sample into a corresponding digital number composed of a set of m parallel bits, in which m is a predetermined plural integer, such as eight, and one of the m bits represents the sign of the polarity of the instantaneous-amplitude of each successive sample.

The successive digital-output samples from converters 204 and 208, respectively, are applied as inputs to MTI cancellers 206 and 210, respectively, or in a case of no MTI processing bypass the MTI filter. As is known in the art, in the case of MTI processing, a plurality of successive exploratory pulses to derive the MTI residue output signal is required. The greater the number of successive exploratory pulses employed by a MTI canceller, the greater is its ability to reject (in dB) unwanted targets (clutter) such as, stationary and low-velocity target signals, but the more complex is the structure of the MTI filter. Therefore, although MTI cancellers 206 and 210 may be of a type which employs three or more successive exploratory pulses, it is assumed, for illustrative purposes, that each of MTI cancellers 206 and 210 is a relatively simple 2-pulse digital MTI canceller. In this assumed case, each of the MTI cancellers 206 and 210 may comprise an individual shift register for each of the m bits, each shift register having several thousand stages for storing all the samples in the given range interval of interest from a first of two successive exploratory pulses. Then, during the occurrence of the same given range interval of the second of the two successive exploratory pulses, the shift register is read out and each successive digital-valued sample of the second exploratory pulse is subtracted from the corresponding digital-valued sample of the first exploratory pulse, with the successive digital-valued difference signals constituting the MTI residue output signal from the canceller. Thus, the MTI residue output signal from each of the MTI cancellers 206 and 210 is in the form of a series of l bit digital numbers ($l \geq m$, since there could be growth in the filter) each corresponding to the algebraic value of the respective samples of the instantaneous amplitude of the residue over the given range interval of interest. In the case of non-MTI mode, the series would consist of m bits of the sampled signal.

The implementation of the next blocks (#212–220) are given as a single illustration. The given illustration is more educational than would be the case in an actual hardware implementation. For example, the lookup tables of both ATAN and TAN along with corresponding sign could be combined into a single table.

The sign bit of the l-bit digital output signal is then applied and stored in sign bit (SB) register 212 and the remaining ones of the l-bit output from 206, which represent the absolute digital value of each successive sample, are applied as an address input to arctangent read-only memory (ROM) 214. In a similar manner, the sign bit from 210 is applied to and stored in SB register 216 and the remaining ones of the l-bits from 210 are applied as an address input to arctangent ROM 214. Thus, if, as assumed, l is equal to eight, the arctangent ROM 214 has a 14 bit address applied thereto (i.e., the seven non-sign bits from each of cancellers 206 and 210).

Arctangent ROM 214 operates as a look-up table for deriving a multi-bit digital output corresponding to a value between 0 and $\pi/2$ radians (in the first quadrant) of the phase angle $\theta$ defined by the digital-value of the 14-bit address applied to arctangent ROM 214 for each successive sample. Many different addresses correspond to the same value of phase angle $\theta$, since the arctangent depends on the ratio of the absolute digital values of the in-phase component from canceller 206 to the absolute digital value of the quadrature-phase component from canceller 210, rather than on the respective digital values themselves. For instance, so long as the respective absolute digital values of the outputs from cancellers 206 and 210 are equal to each other, the tangent has a value of unity, and, therefore, the phase angle $\theta$ will be $\pi/4$ radians.

The purpose of arctangent ROM 214 is to strip amplitude-modulation from the successive samples. The amplitude contains the relative strength of the noise, clutter, and target if one is present. Amplitude modulation represents a degradation in the phase-modulated signal, which is removed by ROM 214. However, phase-modulation, which is due both to target signals, noise and clutter, is retained by the successive samples of the phase angle $\theta$ at the output of arctangent ROM 214. Since the portion of the phase-modulation due to noise is random with respect to the serial phase code, while the portion of the phase-modulation due to a target echo is coherent with respect to the serial phase code, correlation techniques may be employed to enhance the signal relative to the noise.

The serial phase code of the received target echo signals is displaced with respect to the serial phase code of the exploratory pulse by an amount which depends upon the range, aspect angle, S/N, etc. of each particular target. Thus, this phase displacement may have any value between 0 and $2\pi$ radians. For this reason, it is necessary to separately correlate the in-phase and quadrature-phase components of the phase-angle output from arctangent ROM 214 with a sequence of the serial phase code which is phase-coherent with that of the exploratory pulse. Then, by summing and squaring the in-phase correlation components and the quadrature-phase correlation components, a resultant correlation signal can be derived that has a value which is independent of the phase displacement between the target echo signal and the exploratory pulse.

In order to accomplish this correlation, the multi-bit digital output of arctangent ROM 214, corresponding to the digital value of phase angle $\theta$ of each successive sample, is applied as an address to second ROM 217. Second ROM 217 operates as a look-up table to derived a first p-bit (where p is an integer such as 3) output (x) for each successive sample having a digital value corresponding to the absolute value of the in-phase component cos $\theta$ of each successive sample. Second ROM 217 also operates as a look-up table to derive a second p-bit output signal (y) for each successive sample having a digital value corresponding to the absolute value of the quadrature-phase component sin $\theta$ for each successive sample. SB (x) combiner 218 restores the algebraic value of the in-phase component by adding the sign bit stored in register 212 for each sample to the x-component output from second ROM 217. Thus, the digital output from combiner 218 comprises $p+1$ bits, with one of the bits representing the sign of the in-phase component $\pm x$. In a similar manner, combiner SB (y) adds the sign bit stored in register 216 for each sample to produce an algebraic quadrature-phase output $\pm y$.

The output from in-phase combiner 218 is applied as the first input to n-bit correlator 222 and the output from quadrature-phase combiner 220 is applied as a first input to n-bit correlator 224. Continuously repeating sequences of the serial phase code, which are coherent with the serial phase code that actually phase-modulates each of the exploratory pulses, are applied a second input to both correlators 222 and 224. As discussed above, the number of bits in the serial phase code is equal or less than n (with n, by way of example, having a value of 128).

Each of the correlators 222 and 224 correlates successive running sequences of n successive samples (i.e., first a set comprising samples 1 through n is correlated, then a set comprising samples 2 through (n+1) is correlated and so on). In the case of a binary phase code, correlation is achieved by reversing the sign bit of each sample only in response to the binary value of the corresponding serial phase code bit representing a negative value and, thereafter, algebraically summing the digital values of n successive samples. The successive digital values of successive n-bit correlations constitutes the output from each n-bit correlator. The correlation by n-bit correlators 222 and 224 substantially removes the random, noise component of the phase-modulation present in the received signal. By squaring the digital value of each correlation of in-phase correlator 222 in multiplier 226 and squaring the digital value of each correlation of quadrature-phase correlator 224 in multiplier 228, and then adding the outputs of multipliers 226 and 228 in summer 230, a resultant digital correlation output signal is derived.

Threshold comparator logic 232 compares the digital value of the resultant correlation output from summer 230 with the then-existing digital value of a threshold signal applied to threshold comparator 232 from automatic control system 102. Threshold comparator logic 232 produces an output therefrom only if the digital value of the resultant correlation signal exceeds that of the threshold. The corresponding range of the output from threshold comparator logic 232 is then applied as a data input signal to automatic control system 102.

It should be understood that, in practice, automatic control system 102 is normally associated with other input and output devices, besides radar 100 and processor 106. Further, as known in the art, automatic control system 102 normally includes a programmed digital computer and memory bank which respond to data signals applied thereto, from associated input and output devices, to generate appropriate output control signals for the associated input and output devices. Automatic control system 102, per se, does not form any part of the present invention. The implementation of the look-up table means in FIG. 2 with ROMs is only illustrative. Any other type of digital function-generator (including, but not limited to other types of look-up table means) known in the art to derive the arctangent of the ratio of the in-phase component to the quadrature-phase component and/or the cosine and sine of an angle, could be employed instead of ROMs. Equally as well, the different separate ROMs could all be combined into a single ROM look-up table. Further, the technique, per se, for stripping the amplitude-modulation noise component from an in-phase and quadrature-phase samples of the digitized angle-modulation (i.e., phase-modulation, frequency-modulation, etc.) component of a signal by deriving the arctan of the ratio of the in-phase and quadrature-phase components (rather than by removing the amplitude-modulation by conventional limiting) is a novel sub-combination that is part of the present invention.

What is claimed is:

1. In the combination of a moving target indicator (MTI) radar and a digital constant false alarm rate (CFAR) signal processor for use with an automatic control system, wherein said radar derives separate in-phase and quadrature-phase detected signals in response to received echoes of transmitted exploratory pulses each of which pulses is phase-coded at a given frequency in accordance with a serial code of no more than n bits, wherein n is a first predetermined plural integer, said serial code having a duration which is short relative to that of a given range interval, the improvement wherein said digital CFAR signal processor comprises:

first means having said in-phase detected signal applied as an input thereto and second means having said quadrature-phase detected signal applied as an input thereto, each of said first and second means including an analog-to-digital converter and an MTI canceller for sampling its applied detected signal at a rate at least twice that of said given frequency over substantially said given range interval of each of a plurality of successive exploratory pulses to derive an MTI residue output signal in the form of a series of m-bit digital numbers each corresponding to the algebraic value of the respective samples of the instantaneous amplitude of the residue over said given range interval, wherein m is a second predetermined plural integer and one of said m bits represents the sign of the polarity of the instantaneous amplitude of said residue, digital function-generator means responsive to the absolute digital value of the m-bits of the first-means residue output signal corresponding to each successive sample and to the absolute digital value of the m-bits of the second-means residue output signal corresponding to that sample for deriving a first p-bit digital signal corresponding to the absolute value of the cosine of the arctangent of the phase angle defined by the residue output signals of said first and second means for that sample and for deriving a second p-bit digital signal corresponding to the absolute value of the sine of the arctangent of the phase angle defined by the residue output signals of said first and second means for that sample, third means for digitally adding the sign bit of the m-bits of the first-means residue output signal of each successive sample to the first p-bit digital signal for that sample to derive a first (p+1) bit digital signal for that sample and for adding the sign bit of the m-bits of the second-means residue output signal of each successive sample to the second p-bit digital signal for that sample to derive a second (p+1) bit digital signal for that sample, correlation means including a first n-bit correlator for digitally correlating successive running sequences of n successive ones of said first (p+1) bit digital signals with said n-bit serial code and a second n-bit correlator for digitally correlating successive running sequences of n successive ones of said second (p+1) bit digital signals with said n-bit serial code, fourth means for digitally summing the squares of each successive digital correlation by said first and second correlators to produce a digital valued output signal therefrom for each of said successive correlations, and threshold comparator means having the output of said fourth means and a variable-threshold digital-valued signal applied as respective inputs thereto for deriving a digital CFAR output therefrom only when the digital value of the output signal from said fourth means exceeds the digital value of said threshold signal.

2. The combination defined in claim 1, wherein said digital-function generator means comprises look-up table means.

3. The combination defined in claim 2, wherein said look-up table means comprises an arctangent read-only memory (ROM) addressed by all of said m-bits, other than said sign bit, of both said first and second means residue output signals to derive a digital output representing the value of said phase angle for each successive sample and a sine and cosine ROM addressed by the digital output of said arctangent ROM for respectively deriving said first and second p-bit signals for each successive sample.

4. The combination defined in claim 1, wherein n is 128.

5. The combination defined in claim 1, wherein m is 8.

6. The combination defined in claim 1, wherein p is 3.

* * * * *